US012129711B2

(12) United States Patent
Cao

(10) Patent No.: US 12,129,711 B2
(45) Date of Patent: Oct. 29, 2024

(54) LOW-COST, HIGH-STRENGTH AND EASY-TO-ASSEMBLE METAL MESH PLATE STRUCTURE

(71) Applicant: Xin Cao, Guangdong (CN)

(72) Inventor: Xin Cao, Guangdong (CN)

( * ) Notice: Subject to any disclaimer, the term of this patent is extended or adjusted under 35 U.S.C. 154(b) by 399 days.

(21) Appl. No.: 17/546,060

(22) Filed: Dec. 9, 2021

(65) Prior Publication Data

US 2023/0160259 A1 May 25, 2023

(30) Foreign Application Priority Data

Nov. 24, 2021 (CN) ........................ 202122895688.2

(51) Int. Cl.
*E06B 9/52* (2006.01)
*A47B 96/02* (2006.01)
*A47B 97/00* (2006.01)

(52) U.S. Cl.
CPC ................ *E06B 9/52* (2013.01); *A47B 97/00* (2013.01); *A47B 2220/0052* (2013.01); *E06B 2009/524* (2013.01); *E06B 2009/527* (2013.01)

(58) Field of Classification Search
None
See application file for complete search history.

(56) References Cited

U.S. PATENT DOCUMENTS 1,659,101 A * 2/1928 Harvey ..................... E06B 9/52 403/401
1,698,064 A * 1/1929 Otto .......................... E06B 9/52 160/397
1,772,780 A * 8/1930 Milone ..................... E06B 9/52 160/371
2,139,423 A * 12/1938 Scheeler ................... E06B 9/01 29/897.15
3,374,597 A * 3/1968 Whitener .................. E06B 9/52 D25/48.8
3,379,237 A * 4/1968 Pepperell .................. E06B 9/01 160/381
3,552,476 A * 1/1971 Le Tarte ................... E06B 9/52 24/615
3,763,918 A * 10/1973 Clark ........................ E06B 9/52 29/897.3
4,002,195 A * 1/1977 Nagase ..................... E06B 9/52 160/379
4,127,156 A * 11/1978 Brandt ...................... E06B 9/01 160/369

(Continued)

*Primary Examiner* — Phi D A
(74) *Attorney, Agent, or Firm* — Birchwood IP

(57) ABSTRACT

A metal mesh plate structure having a metal mesh plate and an outer frame; the outer frame has a first clamping part and a second clamping part, the first clamping part and the second clamping part clamp the periphery of the metal mesh plate; the second clamping part of the outer frame is provided with a reinforcing folding part integrally bent with the second clamping part, and the outer wall of the reinforcing folding part is provided with at least one buckle; a reinforcing frame body is clamped with the reinforcing folding part of the outer frame; the inner wall of the reinforcing frame body is provided with a clamping groove matched with the buckle, and the buckle on the reinforcing folding part is clamped into the clamping groove on the reinforcing frame body to fixedly connect the reinforcing folding part with the reinforcing frame body.

9 Claims, 10 Drawing Sheets

(56) References Cited

U.S. PATENT DOCUMENTS

| | | | | | |
|---|---|---|---|---|---|
| 5,141,046 | A * | 8/1992 | Duncan | E06B 9/52 D25/48.8 |
| 5,791,501 | A * | 8/1998 | Baldwin, Jr. | A47F 5/132 211/183 |
| 6,125,910 | A * | 10/2000 | Pepperell | E06B 9/01 160/381 |
| 6,230,455 | B1 * | 5/2001 | Arehart | E06B 9/02 52/202 |
| 6,263,949 | B1 * | 7/2001 | Guthrie, Jr. | E06B 9/02 160/371 |
| 6,390,173 | B1 * | 5/2002 | Story, Jr. | E06B 9/52 160/369 |
| 7,195,053 | B2 * | 3/2007 | Pylkki | E06B 9/52 160/371 |
| 8,793,932 | B1 * | 8/2014 | Lindgren | E06B 3/685 49/63 |
| 9,854,906 | B1 * | 1/2018 | Ke | A47B 47/0083 |
| 2003/0029546 | A1 * | 2/2003 | Wylie | E06B 9/52 156/308.2 |
| 2004/0020157 | A1 * | 2/2004 | Bass | E06B 9/52 52/656.2 |
| 2007/0256800 | A1 * | 11/2007 | Armstrong | E06B 9/52 160/371 |
| 2008/0302490 | A1 * | 12/2008 | Wilson | A47B 55/02 |
| 2009/0084507 | A1 * | 4/2009 | Tescher | F24F 6/043 160/113 |
| 2010/0263810 | A1 * | 10/2010 | Goldstein | E06B 9/52 160/381 |
| 2016/0273263 | A1 * | 9/2016 | Farina | E06B 3/16 |
| 2019/0218850 | A1 * | 7/2019 | Brown | E06B 9/24 |
| 2019/0390515 | A1 * | 12/2019 | Garrow | E06B 9/52 |
| 2021/0332641 | A1 * | 10/2021 | LaPlaca | E06B 9/522 |
| 2021/0345777 | A1 * | 11/2021 | Cao | A47B 55/02 |
| 2022/0298857 | A1 * | 9/2022 | LaPlaca | E06B 9/522 |
| 2023/0323733 | A1 * | 10/2023 | Gibbs, Jr. | E06B 9/52 160/369 |

* cited by examiner

LOW-COST, HIGH-STRENGTH AND EASY-TO-ASSEMBLE METAL MESH PLATE STRUCTURE

BACKGROUND OF THE INVENTION

The present disclosure relates to the technical field of metal mesh structure, in particular to a low-cost, high-strength and easy-to-assemble metal mesh plate structure.

Metal mesh plate structures are mostly used in some indoor furniture such as storage racks, wardrobes, shoe cabinets or pet cages that require ventilation, transparency or appearance. However, the existing metal mesh plate structures generally have the disadvantages of complex structure, inconvenient processing, inconvenient assembly and poor rigidity strength, and welding spots or exposed screws can usually be seen in their appearance, so that their appearance needs to be improved. In addition, due to the poor structural rigidity strength of the existing metal mesh plate, it will be deformed greatly when its length is longer, which cannot meet the requirements of rigidity strength whether it is used as the laminate of the shelf for placing articles or as the side plate of the cabinet.

BRIEF SUMMARY OF THE INVENTION

The purpose of the present disclosure is to overcome the above defects in the prior art, and provide a low-cost, high-strength and easy-to-assemble metal mesh plate structure, and mainly solves the technical problems of complex structure, high cost, unattractive appearance, inconvenient assembly and poor rigidity strength of the metal mesh plate structure in the prior art.

In order to achieve the above purpose, the present disclosure provides a low-cost, high-strength and easy-to-assemble metal mesh plate structure, comprising a metal mesh plate and an outer frame, wherein the outer frame is provided with a first clamping part and a second clamping part, and the first clamping part and the second clamping part clamp the periphery of the metal mesh plate; the second clamping part of the outer frame is provided with a reinforcing folding part integrally bent with the second clamping part.

Preferably, the end of the reinforcing folding part is also bent with an inward or outward bending part to further strengthen the rigidity strength of the outer frame, and the shape of the bending part is circular arc or square.

Preferably, the outer wall of the reinforcing folding part is provided with at least one buckle, the structure further comprises a reinforcing frame body clamped with the reinforcing folding part of the outer frame, the second clamping part is erected at the top of the reinforcing frame body, the inner wall of the reinforcing frame body is provided with a clamping groove matched with the buckle, and the buckle on the reinforcing folding part is clamped into the clamping groove on the reinforcing frame body to fixedly connect the reinforcing folding part with the reinforcing frame body, so that the rigidity strength of the outer frame is further enhanced.

Preferably, at least one screw mounting hole is provided on the reinforcing folding part 23.

Preferably, the first clamping part is provided with a blocking part integrally bent with the first clamping part. The blocking part is circular arc or square, and the blocking part plays the role of limiting and blocking, which can prevent articles from falling down.

Preferably, the metal mesh plate is an integrated stretching plate mesh or woven mesh structure provided with any openings.

Preferably, at least one arc groove or U-shaped groove is provided on the metal mesh plate.

Preferably, at least one concave article storage groove is provided on the metal mesh plate.

Preferably, one part of the metal mesh plate is a mesh structure, the other part is a metal plate, the outer shape of the metal mesh plate is square, circular, elliptical, fan-shaped or semi-circular, and the metal plate is provided with decorative patterns or through holes.

Preferably, the reinforcing frame body is provided with an annular concave first stepped groove, and the outer frame is embedded in the first stepped groove. On the one hand, this structural design can further enhance the rigidity strength of the reinforcing frame body, and on the other hand, the embedded outer frame is more beautiful.

Preferably, the reinforcing frame body is further provided with a second stepped groove which is provided adjacent to the first stepped groove, and the reinforcing folding part is close to or abutted against the stepped end face of the second stepped groove.

Preferably, the structure further comprises a reinforcing frame body, wherein the reinforcing frame body is provided with an annular concave first stepped groove, the outer frame is embedded in the reinforcing frame body, so that the second clamping part is erected on the first stepped groove, and the outer side of the reinforcing folding part abuts against the inner side of the first stepped groove or the reinforcing folding part is clamped with the reinforcing frame body, and the reinforcing frame body 3 is provided with a notch, so that the outer frame and the reinforcing frame body form an embedded metal mesh structure.

Compared with the prior art, the present disclosure has the following beneficial effects.

According to the technical scheme, the rigidity strength of the outer frame is enhanced by bending a reinforcing folding part on the second clamping part. At the same time, a buckle is provided on the outer wall of the reinforcing folding part and a clamping groove matched with the buckle is provided on the inner wall of the reinforcing frame body, so that when the buckle on the reinforcing folding part is clamped into the clamping groove on the reinforcing frame body, the outer frame can be fixedly connected with the reinforcing frame body. Through the double reinforcement of the reinforcing folding part and the reinforcing frame body, the metal mesh plate structure of the technical scheme has the advantages of high rigidity and high strength, which will not be deformed greatly when stressed. In addition, the metal mesh structure of this technical scheme has no screws at all in appearance, which meets the aesthetic requirements of users. Secondly, in order to further meet the aesthetic requirements of users, the metal mesh structure of this technical scheme can also make the outer frame and the reinforcing frame body into two different colors, respectively. To sum up, the metal mesh structure of this technical scheme has the advantages of simple structure, low cost, convenient assembly, high rigidity strength and attractive appearance.

BRIEF DESCRIPTION OF THE DRAWINGS

In order to more clearly explain the embodiment of the present disclosures or the technical solutions in the prior art, the drawings needed in the description of the embodiments or the prior art will be briefly introduced. Obviously, the drawings in the following description are some embodiments of the present disclosure. For those skilled in the art, other drawings can be obtained according to these drawings without paying creative efforts.

The reference number:

1. Metal mesh plate; 2. Outer frame; 21. First clamping part; 22. Second clamping part; 23. Reinforcing folding part; 231. Buckle; 232. Bending part; 233. Screw mounting hole; 24. Blocking part; 3. Reinforcing frame body; 31. Clamping groove; 9. Laminate; 93. Arc groove; 32. First stepped groove; 33. Second stepped groove; 34. Notch, 331. Stepped end face.

DETAILED DESCRIPTION OF THE INVENTION

In order to make the purpose, technical scheme and advantages of the embodiment of the present disclosure clearer, the technical scheme in the embodiment of the present disclosure will be clearly and completely described hereinafter with reference to the drawings in the embodiment of the present disclosure. Obviously, the described embodiments are part of the embodiments of the present disclosure, rather than all of the embodiments. Based on the embodiments in the present disclosure, all other embodiments obtained by those skilled in the art without paying creative efforts are within the scope of protection of the present disclosure.

Figure 1:
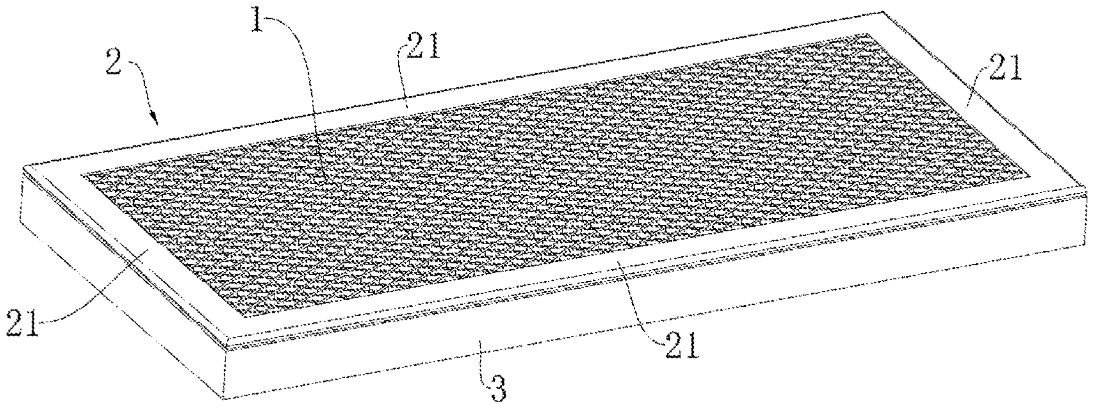
FIG. 1 is a schematic structural diagram of a low-cost, high-strength and easy-to-assemble metal mesh plate structure according to the present disclosure.
Figure 2:
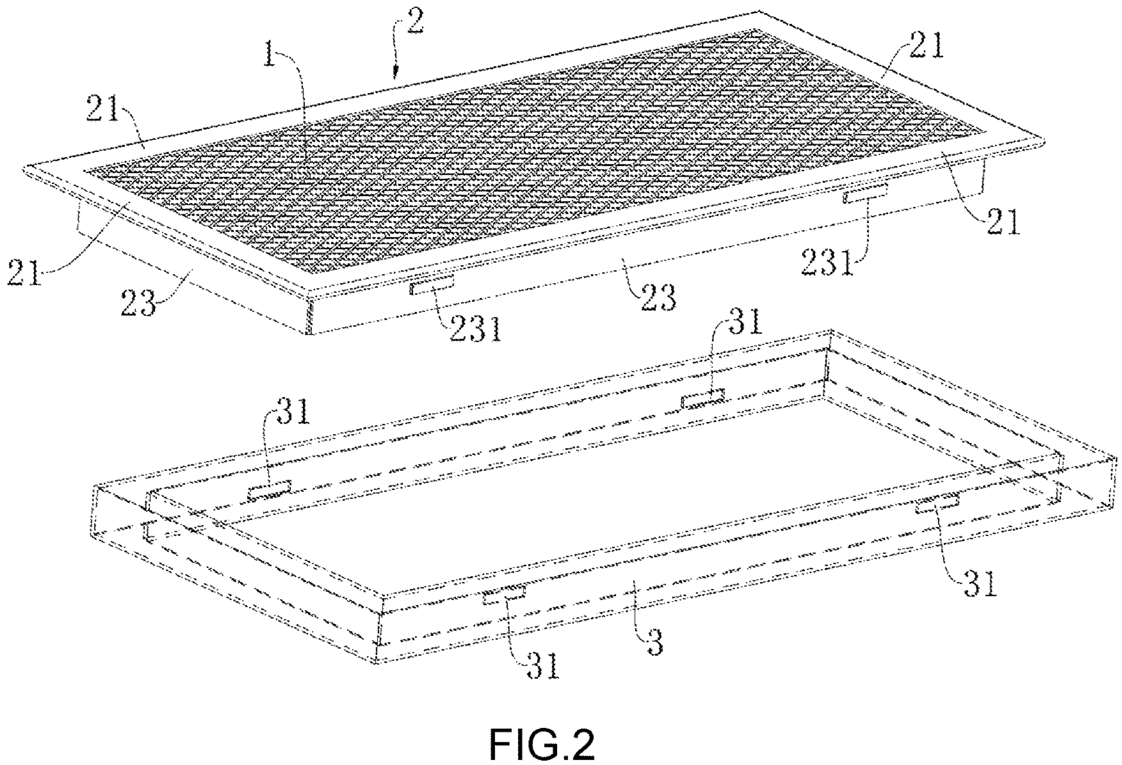
FIG. 2 is an exploded view of a low-cost, high-strength and easy-to-assemble metal mesh plate structure according to the present disclosure.
Figure 3:
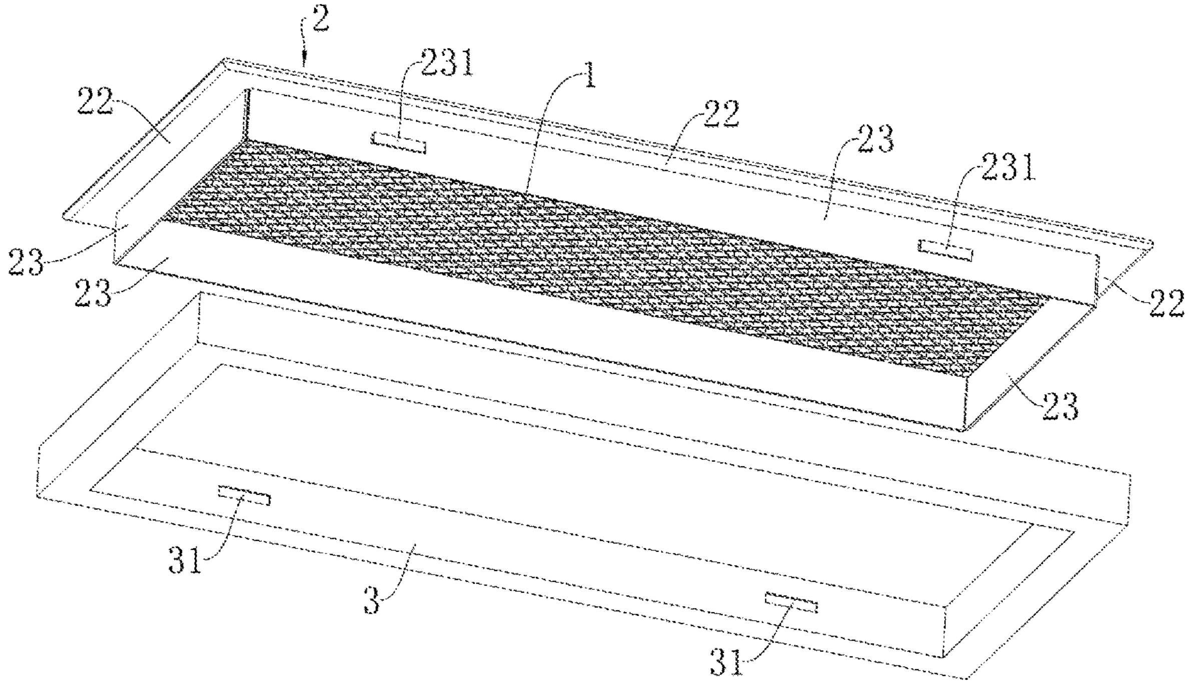
FIG. 3 is an exploded view of a low cost, high strength and convenient assembly metal mesh structure according to the present disclosure from another angle.

Refer to FIGS. 1-3. The present disclosure provides a low-cost, high-strength and easy-to-assemble metal mesh plate structure, comprising a metal mesh plate 1, an outer frame 2, and a reinforcing frame body 3 fixed on the periphery of the outer frame 2. The metal mesh plate 1 is an integrated stretching plate mesh or woven mesh structure provided with any openings. According to the technical scheme, one part of the metal mesh plate 1 is a mesh structure, and the other part is a metal plate. The outer shape of the metal mesh plate is square, round, elliptical, fan-shaped or semi-circular. The metal plate is provided with decorative patterns which can be various patterns with decorative effects. The metal plate can also be provided with through holes for placing potted plants and other articles. In addition, the reinforcing frame body 3 is not limited to the ring shape shown in FIG. 1. When the reinforcing frame body 3 is used as the reinforcing frame body of the cabinet, the reinforcing frame body can have other shapes, which can mount at least two metal mesh plates 1 with outer frames 2.

The outer frame 2 is provided with a first clamping part 21 and a second clamping part 22. The first clamping part 21 and the second clamping part 22 clamp the periphery of the metal mesh plate 1. The second clamping part 22 is erected at the top of the reinforcing frame body 3. In addition, the second clamping part 22 of the outer frame 2 is provided with a reinforcing folding part 23 integrally bent with the second clamping part 22. The outer wall of the reinforcing folding part 23 is provided with at least one buckle 231. The shape of the buckle 231 is spherical or hemispherical. The inner wall of the reinforcing frame body 3 is provided with a clamping groove 31 matched with the buckle 231.

Specifically, in this technical scheme, the rigidity strength of the outer frame 2 is enhanced by bending a reinforcing folding part 23 on the second clamping part 22. At the same time, a buckle 231 is provided on the outer wall of the reinforcing folding part 23 and a clamping groove 31 matched with the buckle 231 is provided on the inner wall of the reinforcing frame body 3, so that when the buckle 231 on the reinforcing folding part 23 is clamped into the clamping groove 31 on the reinforcing frame body 3, the outer frame 2 can be fixedly connected with the reinforcing frame body 3. Through the double reinforcement of the reinforcing folding part 23 and the reinforcing frame body 3, the metal mesh plate structure of the technical scheme has the advantages of high rigidity and high strength. In addition, the metal mesh structure of this technical scheme has no screws at all in appearance, which meets the aesthetic requirements of users. Secondly, in order to further meet the aesthetic requirements of users, the metal mesh structure of this technical scheme can also make the outer frame 2 and the reinforcing frame body 3 into two different colors, respectively. To sum up, the metal mesh structure of this technical scheme has the advantages of simple structure, low cost, convenient assembly, high rigidity strength and attractive appearance.

The bending part of the four corners of the outer frame 2 and the reinforcing frame body 3 can be directly bent, or notches can be provided at the bending part of the four corners of the outer frame 2 and the reinforcing frame body 3, so that the four corners of the outer frame 2 and the reinforcing frame body 3 are bent.

Figure 4:
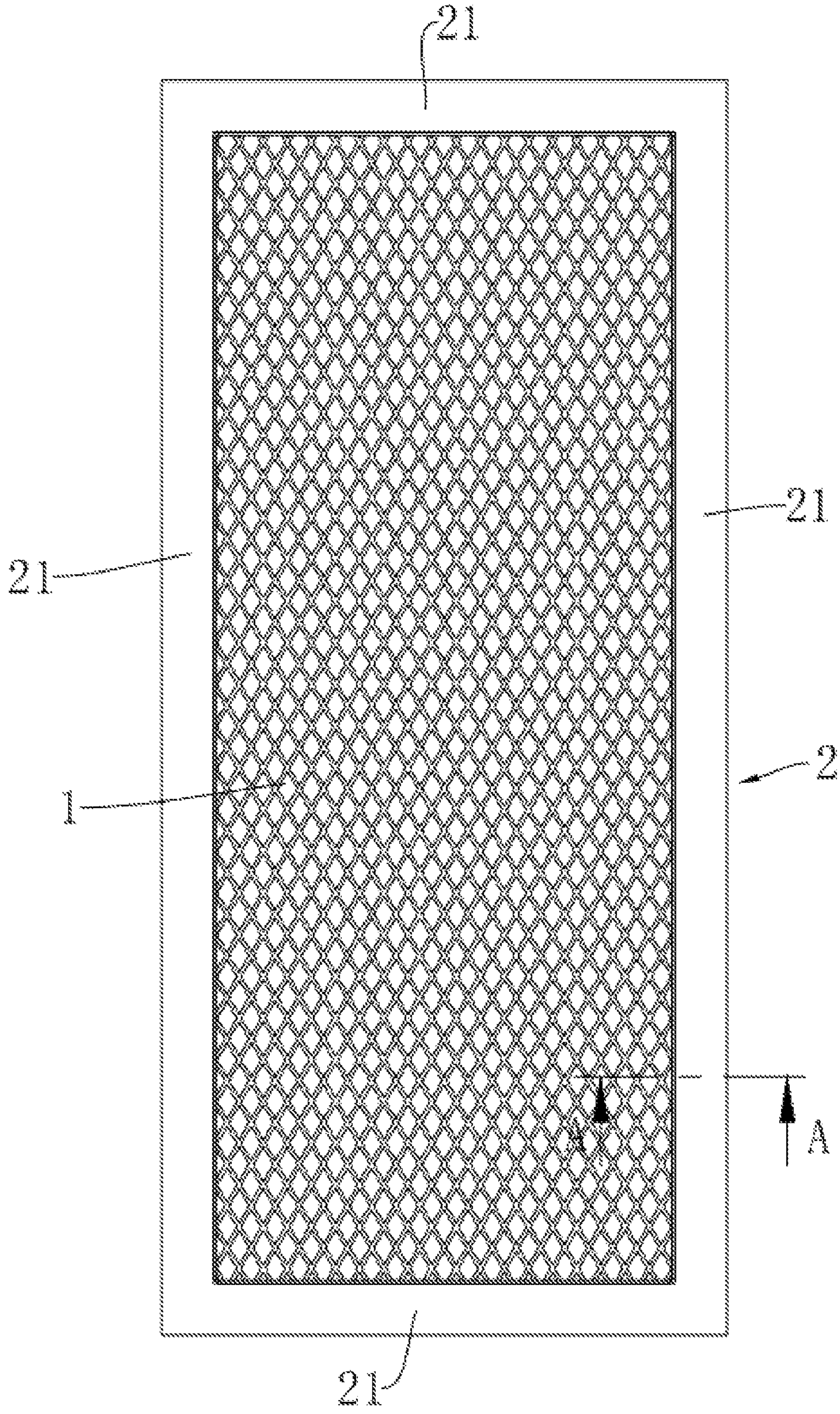
FIG. 4 is a schematic plan view of a low-cost, high-strength and easy-to-assemble metal mesh plate structure according to the present disclosure.
Figure 5:
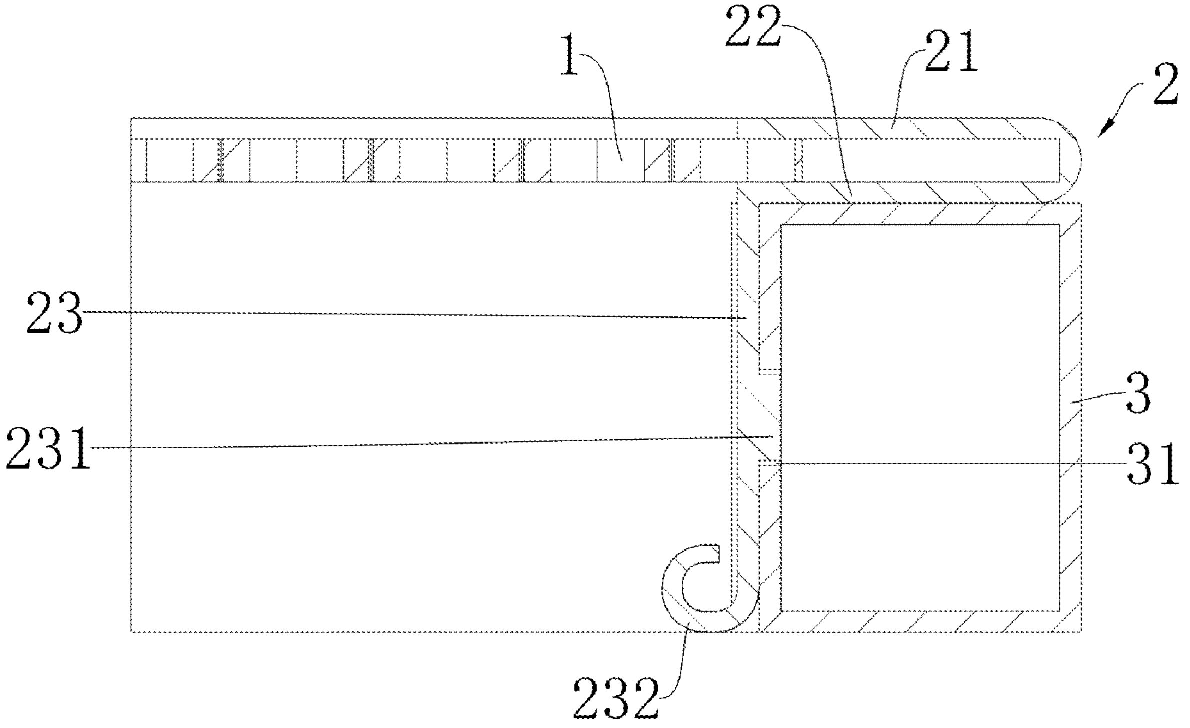
FIG. 5 is a partial enlarged view at A-A in FIG. 4.

Referring to FIG. 4 and FIG. 5, in order to further strengthen the rigidity strength of the outer frame 2, the end of the reinforcing folding part 23 is also bent with an inward or outward bending part 232. The bending part 232 is not limited to the shape shown in FIG. 5. The shape of the bending part 232 is circular arc or square, and other bending shapes can be used.

Figure 6:
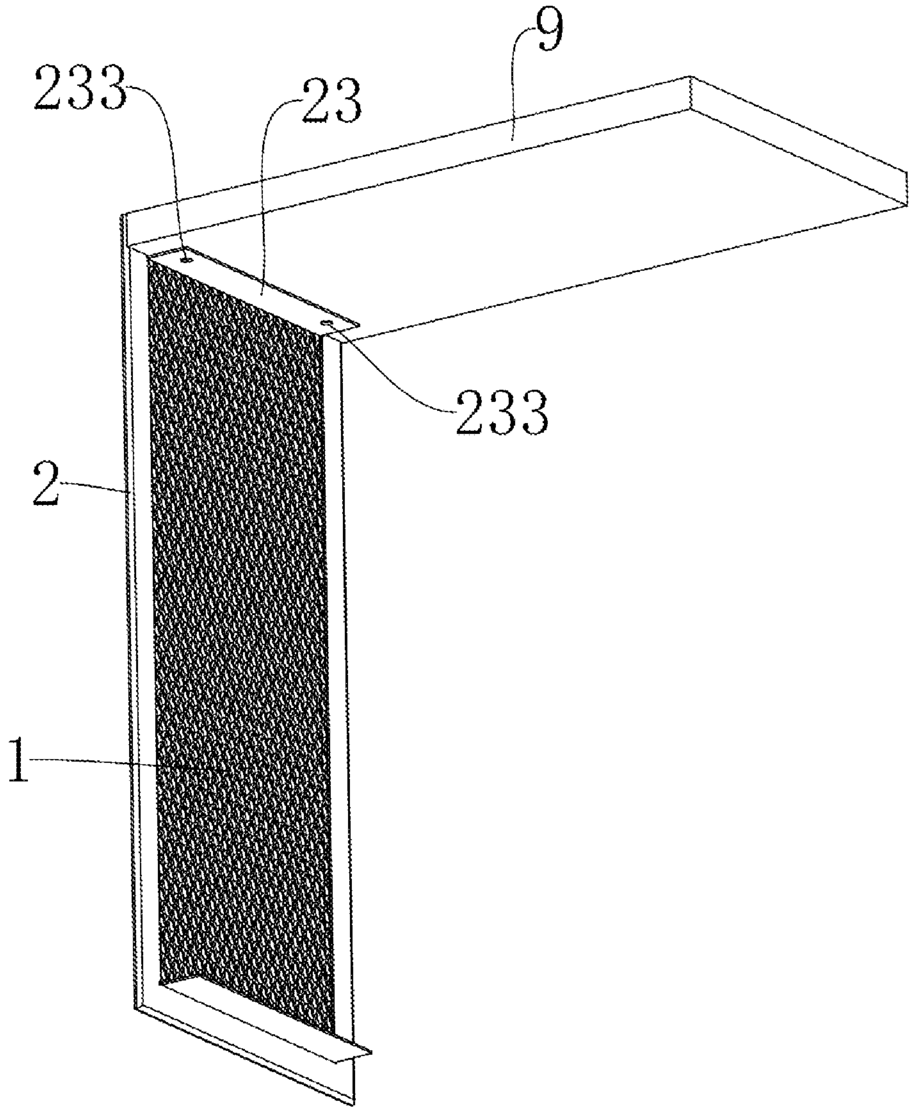
FIG. 6 is a schematic structural diagram of a low-cost and high-strength metal mesh plate structure according to the present disclosure when used as a side plate.

Referring to FIG. 6, it is not necessary to provide the reinforcing frame body 3, and the reinforcing folding part 23 can also play a role of supporting the laminate 9. The laminate 9 can be mounted on the reinforcing folding part 23 at any time or taken out at any time. Of course, if the screw mounting hole 233 is provided in the reinforcing folding part 23, screws can be screwed on the laminate 9 through the screw mounting hole 233 at this time. The fastening connection between the metal mesh structure and the laminate 9 in this technical scheme can be realized, thus facilitating the formation of a cabinet structure with simple structure and high rigidity.

Several notches can also be provided in the reinforcing folding portion 23, which are used to provide the support rods.

According to the technical scheme, one part of the metal mesh plate 1 is a mesh structure, and the other part is a metal plate. The metal mesh plate 1 can also be a metal plate as a whole. The metal mesh plate 1 can be combined with the outer frame 2, or the metal mesh plate 1 and the outer frame 2 can be combined with the reinforcing frame body 3, which can be used as a laminate of a shelf, or as a side plate or a door panel of a cabinet, a stool or a table, etc. The outer frame 2 and the reinforcing frame body 3 can be provided with mounting holes or screw holes.

Figure 7:
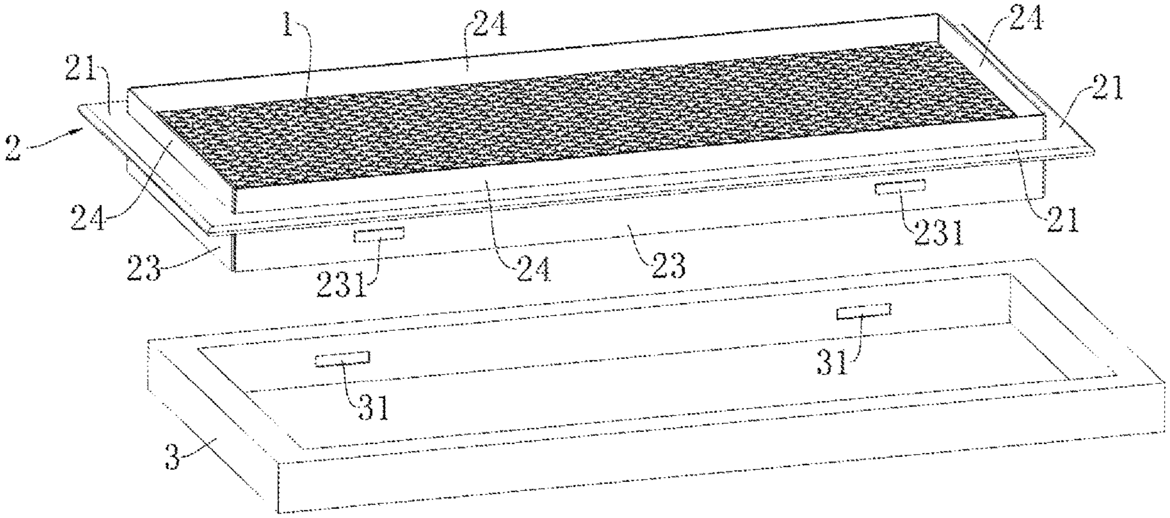
FIG. 7 is a schematic diagram of a low-cost, high-strength and easy-to-assemble metal mesh plate structure which has a blocking part when used as a laminate.

Refer to FIG. 7. When the metal mesh structure of this technical scheme is used as a laminate, the outer frame 2 can further comprise a blocking part 24 integrally bent with the first clamping part 21. The shape of the blocking part 24 is circular arc or square, or other bent shapes. The blocking part 24 plays the role of limiting and blocking, which can prevent articles from falling down.

Figure 8:
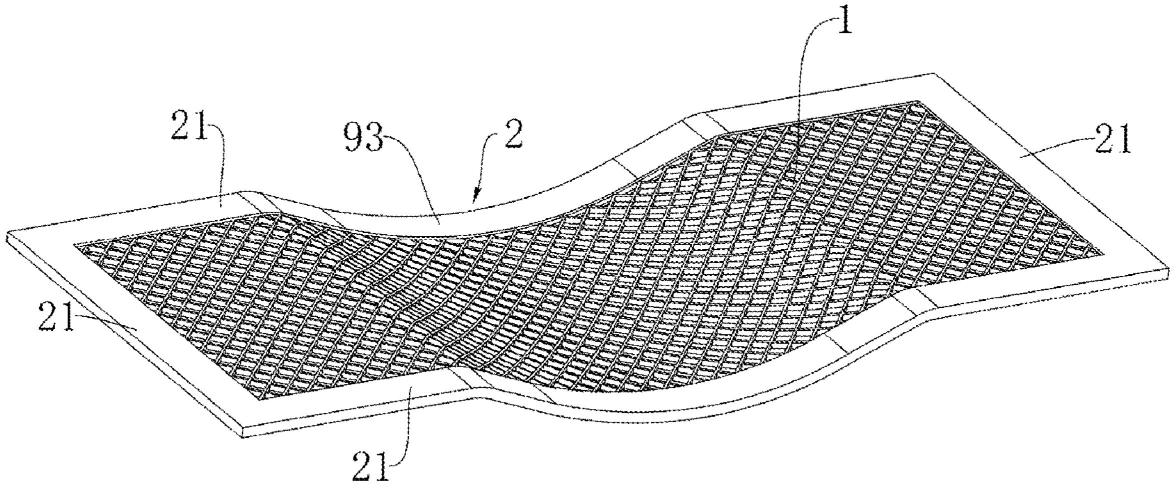
FIG. 8 is a schematic plan view of a low-cost, high-strength and easy-to-assemble metal mesh plate structure according to the present disclosure.
Figure 9:
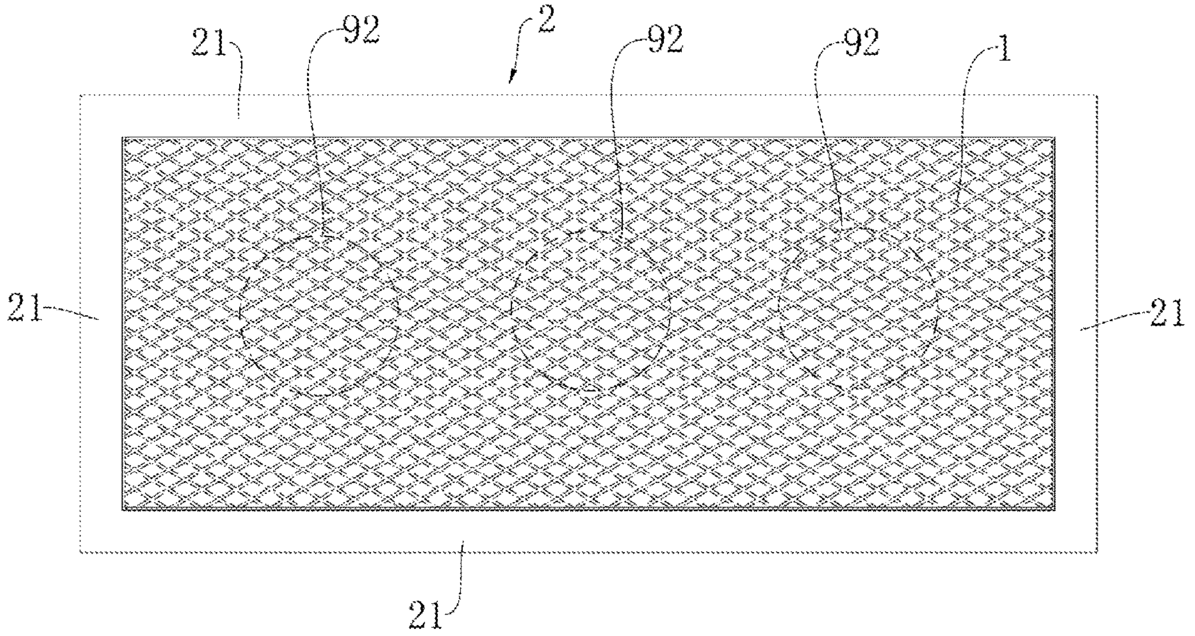
FIG. 9 is another schematic plan view of a low-cost, high-strength and easy-to-assemble metal mesh structure according to the present disclosure.

In addition, when the metal mesh plate structure of this technical scheme is used as a laminate, the metal mesh plate 1 can be provided with at least one arc groove 93 or U-shaped groove. Referring to FIG. 8, the arc groove 93 or U-shaped groove is used to store articles with curved sides (such as wine bottles). In addition, the metal mesh plate 1 can also be provided with at least one concave article storage groove. As shown in FIG. 9, the article storage groove is punched down along the dotted line 92 in the figure, which is convenient to classify and store articles, and at the same time, the articles will not easily fall off.

Figure 10:
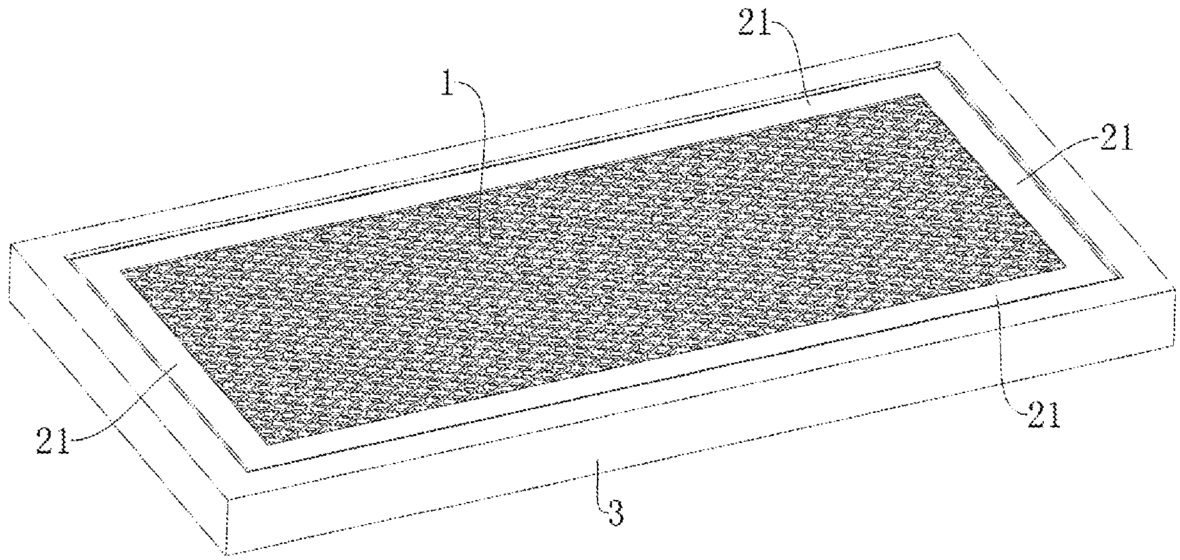
FIG. 10 is a structural schematic diagram of a second low-cost, high-strength and easy-to-assemble metal mesh plate structure according to the present disclosure.
Figure 11:
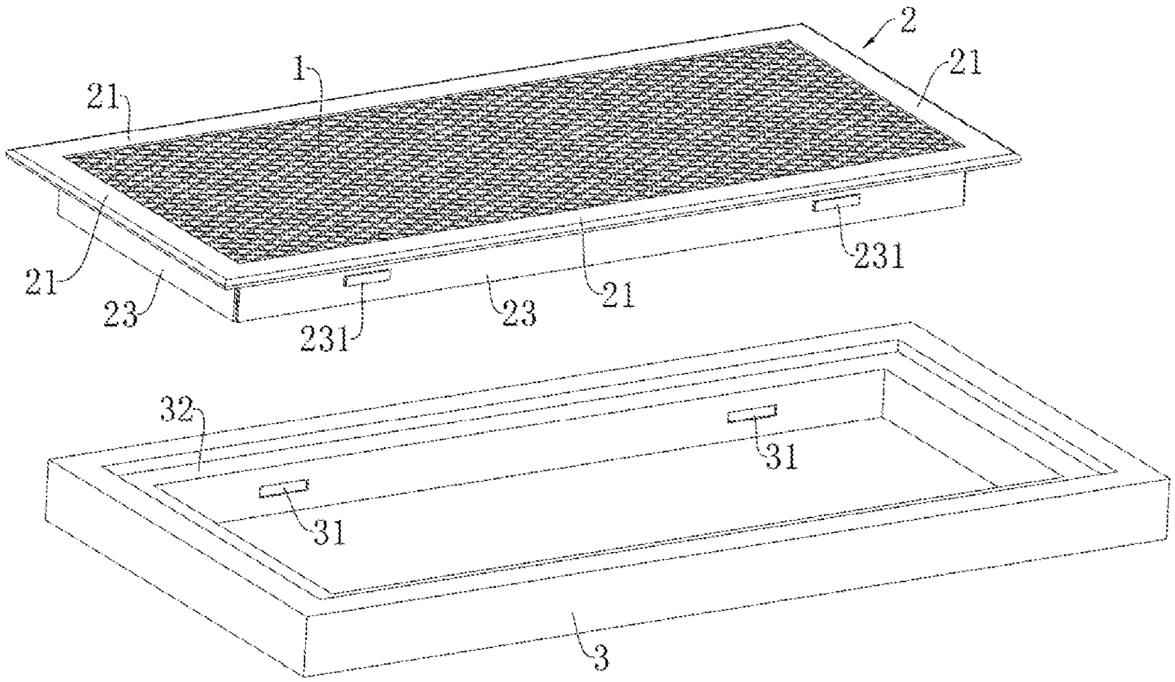
FIG. 11 is an exploded view of a second low-cost, high-strength and easy-to-assemble metal mesh plate structure according to the present disclosure.

Refer to FIG. 10 and FIG. 11. In another embodiment other than this embodiment, the reinforcing frame body 3 is provided with an annular concave first stepped groove 32, and the outer frame 2 is embedded in the first stepped groove 32. On the one hand, this structural design can further enhance the rigidity strength of the reinforcing frame body 3, and on the other hand, the embedded outer frame 2 is more beautiful. Especially when the reinforcing frame body 3 and the outer frame 2 are made into two different colors, respectively, the appearance is more personalized and meets requirements of different users.

Figure 12:
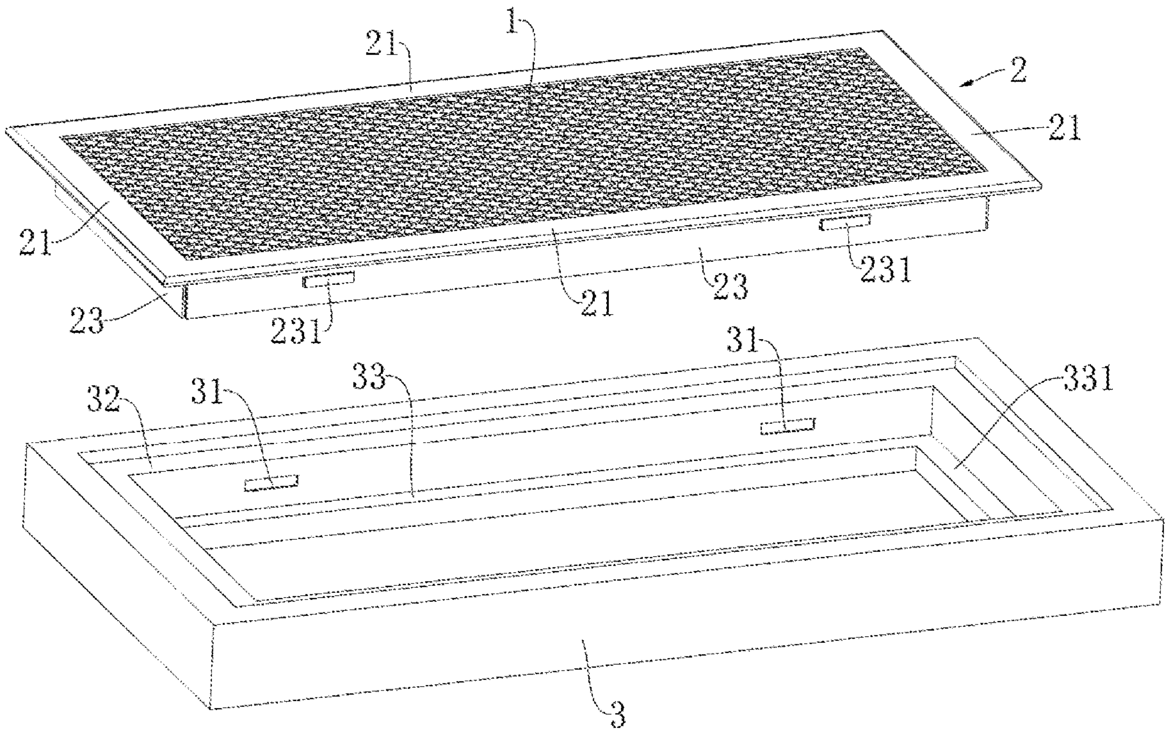
FIG. 12 is an exploded view of a third low-cost, high-strength and easy-to-assemble metal mesh plate structure according to the present disclosure.

Secondly, referring to FIG. 12, the reinforcing frame body 3 can be further provided with a second stepped groove 33 which is provided adjacent to the first stepped groove 32, and the reinforcing folding part 23 is close to or abutted against the stepped end face 331 of the second stepped groove 33. With this structural design, the reinforced folding part 23 can be hidden, and the overall appearance integrity of the whole metal mesh structure is stronger. At the same time, users will not touch the end of the reinforced folding part 23, and the end of the reinforced folding part 23 will not cut their hands. Of course, the reinforcing frame body 3 with this structural design has stronger rigidity.

Figure 13:
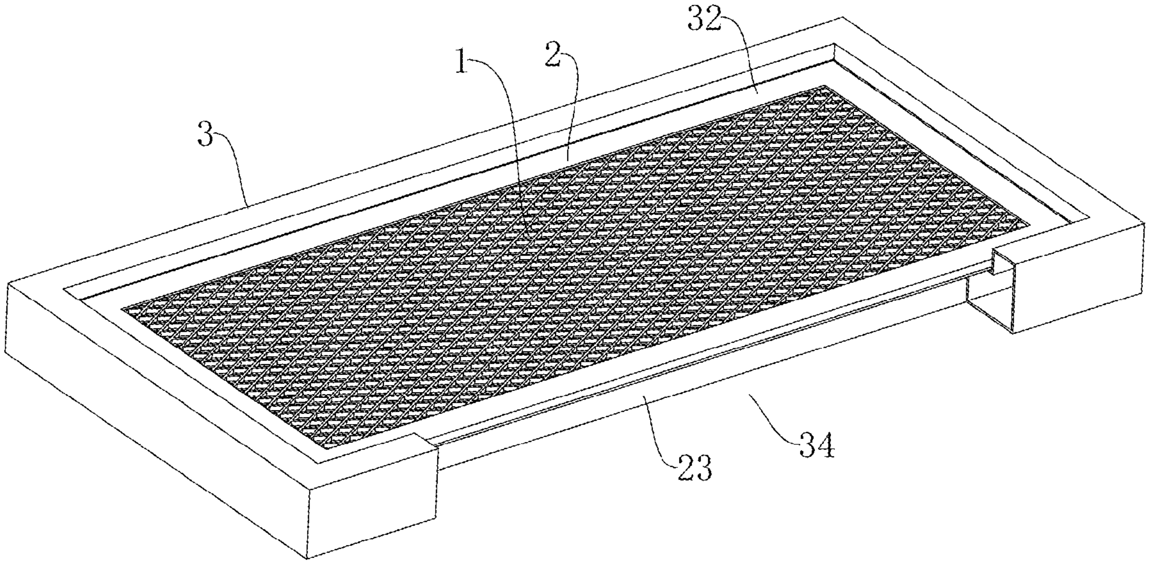
FIG. 13 is a structural schematic diagram of a fourth low-cost, high-strength and easy-to-assemble metal mesh plate structure according to the present disclosure.
Figure 14:
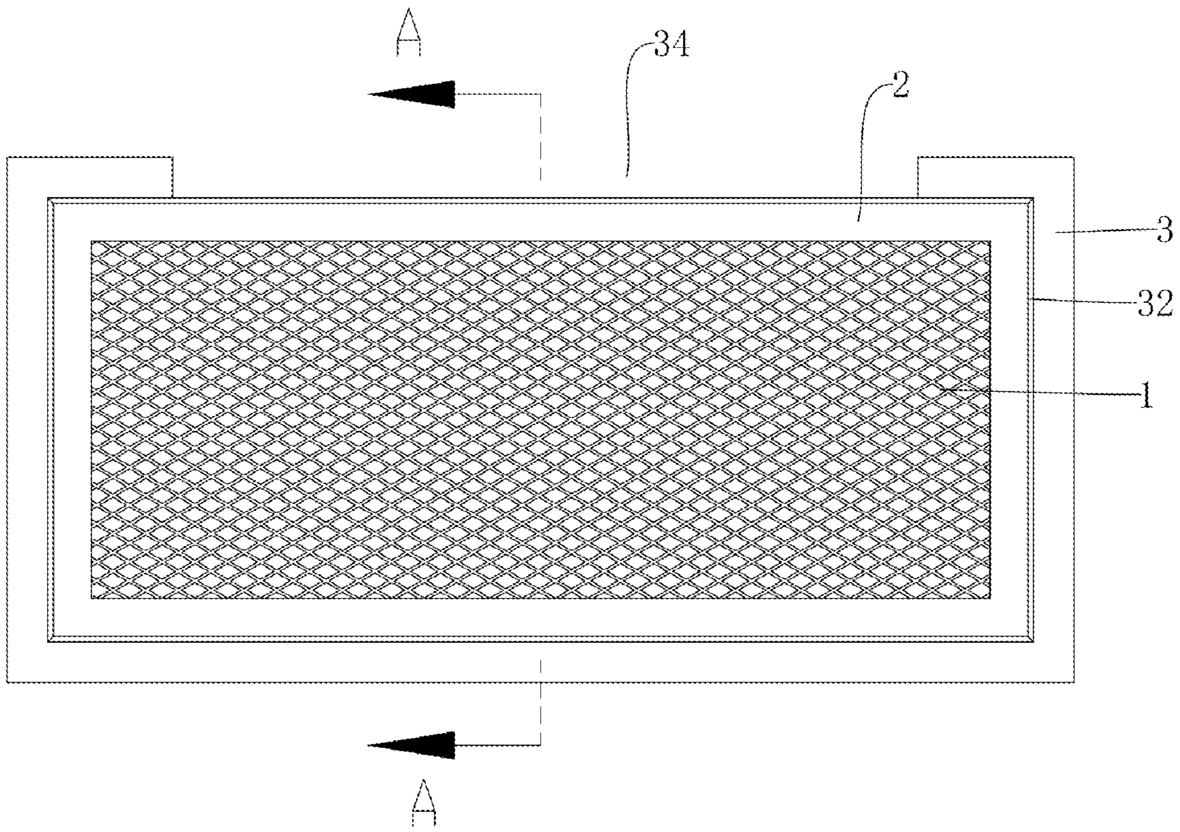
FIG. 14 is a top view of a fourth low-cost, high-strength and easy-to-assemble metal mesh plate structure according to the present disclosure.
Figure 15:
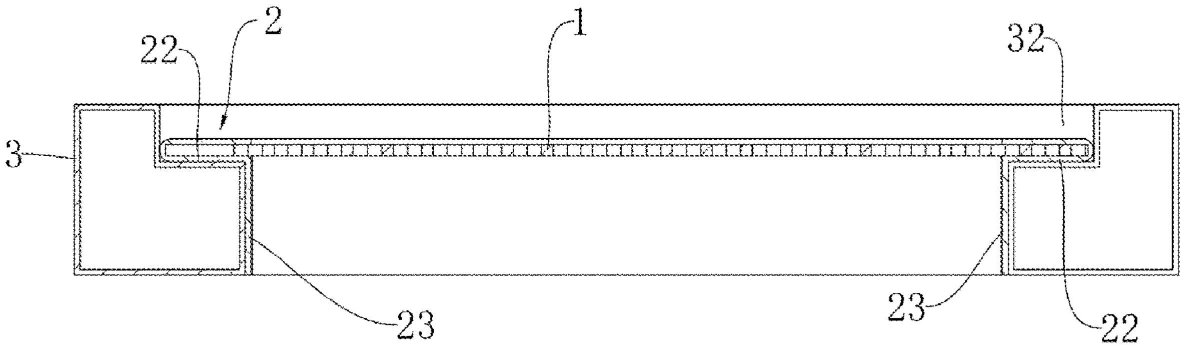
FIG. 15 is a sectional view at A-A in FIG. 14.

As another embodiment of the present disclosure, referring to FIG. 13, FIG. 14 and FIG. 15, the outer frame 2 is embedded into the reinforcing frame body 3, so that the outer frame 2 and the reinforcing frame body 3 form an embedded metal mesh structure. The reinforcing frame body 3 is provided with an annular concave first stepped groove 32, the outer frame 2 is embedded in the reinforcing frame body 3, so that the second clamping part 22 is erected on the first stepped groove 32, and the outer side of the reinforcing folding part 23 abuts against the inner side of the first stepped groove 32 or the reinforcing folding part 23 is clamped with the reinforcing frame body 3. In this way, the outer frame 2 can be embedded into the reinforcing frame body 3. The side wall at the top of the first stepped groove 32 of the reinforcing frame body 3 can form an integrally bent blocking part to prevent the articles placed on the metal mesh plate 1 from slipping off. In addition, the reinforcing frame body 3 is provided with a notch 34, which is convenient for taking and placing articles from the metal mesh plate 1.

The top of the first clamping part 21 may be flush with the top of the reinforcing frame body 3, and the top of the first clamping part 21 may be lower than the top of the reinforcing frame body 3.

The above embodiments are the preferred embodiments of the present disclosure, but the implementation of the present disclosure is not limited by the above embodiments. Any other changes, modifications, substitutions, combinations and simplifications that do not deviate from the spirit and principle of the present disclosure should be equivalent replacement methods, which are all included in the scope of protection of the present disclosure.

What is claimed is:

1. A low-cost, high-strength and easy-to-assemble metal mesh plate structure, comprising a metal mesh plate (1) and an outer frame (2), wherein the outer frame (2) is provided with a first clamping part (21) and a second clamping part (22), and the first clamping part (21) and the second clamping part (22) clamp a periphery of the metal mesh plate (1);

the second clamping part (22) of the outer frame (2) is provided with a reinforcing folding part (23) integrally bent with the second clamping part (22);

wherein an outer wall of the reinforcing folding part (23) is provided with at least one buckle (231), a shape of the buckle (23) is spherical or hemispherical, the structure further comprises a reinforcing frame body (3) clamped with the reinforcing folding part (23) of the outer frame (2), the second clamping part (22) is erected at a top of the reinforcing frame body (2), an inner wall of the reinforcing frame body (3) is provided with a clamping groove (31) matched with the buckle (231), and the buckle (231) on the reinforcing folding part (23) is clamped into the clamping groove (31) on the reinforcing frame body (3) to fixedly connect the reinforcing folding part (23) with the reinforcing frame body (3).

2. The low-cost, high-strength and easy-to-assemble metal mesh plate structure according to claim 1, wherein the reinforcing frame body (3) is provided with an annular concave first stepped groove (32), the outer frame (2) is embedded in the reinforcing frame body (3), so that the second clamping part (22) is erected on the first stepped groove (32), and an outer side of the reinforcing folding part (23) abuts against an inner side of the first stepped groove (32) or the reinforcing folding part (23) is clamped with the reinforcing frame body (3), and the reinforcing frame body (3) is provided with a notch (34).

3. The low-cost, high-strength and easy-to-assemble metal mesh plate structure according to claim 1, wherein an end of the reinforcing folding part (23) is further provided with an inward or outward bending part (232).

4. The low-cost, high-strength and easy-to-assemble metal mesh plate structure according to claim 1, wherein at least one screw mounting hole (233) is provided on the reinforcing folding part (23).

5. The low-cost, high-strength and easy-to-assemble metal mesh plate structure of claim 1, wherein the first clamping part (21) is provided with a blocking part (24) integrally bent with the first clamping part (21).

6. The low-cost, high-strength and easy-to-assemble metal mesh plate structure according to claim 1, wherein at least one arc groove or U-shaped groove is provided on the metal mesh plate (1).

7. The low-cost, high-strength and easy-to-assemble metal mesh plate structure according to claim 1, wherein at least one concave article storage groove is provided on the metal mesh plate (1).

8. The low-cost, high-strength and easy-to-assemble metal mesh plate structure according to claim 1, wherein one part of the metal mesh plate (1) is a mesh structure, the other part of the metal mesh plate (1) is a metal plate, an outer shape of the metal mesh plate (1) is square, circular, elliptical, fan-shaped or semi-circular, and the metal plate is provided with decorative patterns or through holes.

9. The low-cost, high-strength and easy-to-assemble metal mesh plate structure according to claim 1, wherein the reinforcing frame body (3) is further provided with a second stepped groove (33) which is provided adjacent to the first stepped groove (32), and the reinforcing folding part (23) is close to or abutted against the stepped end face (331) of the second stepped groove (33).

* * * * *